United States Patent
Takemori et al.

(10) Patent No.: US 11,772,175 B2
(45) Date of Patent: Oct. 3, 2023

(54) GEAR MACHINING APPARATUS AND MACHINING CONDITION DETERMINATION DEVICE

(71) Applicant: JTEKT CORPORATION, Osaka (JP)

(72) Inventors: Kiyoshi Takemori, Kariya (JP); Hisashi Otani, Anjo (JP); Hiroyuki Nakano, Tokai (JP)

(73) Assignee: JTEKT CORPORATION, Kariya (JP)

( * ) Notice: Subject to any disclaimer, the term of this patent is extended or adjusted under 35 U.S.C. 154(b) by 194 days.

(21) Appl. No.: 17/305,529

(22) Filed: Jul. 9, 2021

(65) Prior Publication Data

US 2022/0009016 A1 Jan. 13, 2022

(30) Foreign Application Priority Data

Jul. 13, 2020 (JP) .................................. 2020-120165

(51) Int. Cl.
*B23F 19/10* (2006.01)
*B23F 5/22* (2006.01)
(Continued)

(52) U.S. Cl.
CPC .............. *B23F 19/104* (2013.01); *B23F 5/22* (2013.01); *B23F 23/006* (2013.01);
(Continued)

(58) Field of Classification Search
CPC ................ B23F 19/104; B23F 19/102; B23F 19/10–19/125; B23F 17/006;
(Continued)

(56) References Cited

U.S. PATENT DOCUMENTS

| 2,451,447 A | * | 10/1948 | Ransome | ................... | B23F 5/22 |
| | | | | | 409/19 |
| 7,599,824 B2 | * | 10/2009 | Shigemi | ............... | G05B 19/186 |
| | | | | | 700/98 |
| 2004/0109735 A1 | * | 6/2004 | Arvin | ...................... | B23F 21/16 |
| | | | | | 409/12 |

FOREIGN PATENT DOCUMENTS

DE 10230148 A1 * 1/2004
GB 1297358 A * 11/1972
(Continued)

OTHER PUBLICATIONS

Machine Translation of DE 10230148, which DE '148 was published Jan. 2004.*
(Continued)

*Primary Examiner* — Erica E Cadugan

(74) *Attorney, Agent, or Firm* — Oblon, McClelland, Maier & Neustadt, L.L.P.

(57) ABSTRACT

A gear machining apparatus includes: a hob cutter; at least one processor; and at least one memory having instructions. The instructions, when executed by the at least one processor, cause the gear machining apparatus to perform operations including: performing first chamfering on a first axial end of a gear profile by relatively moving the hob cutter with respect to a workpiece in radial and axial directions of the workpiece; performing, subsequent to the first chamfering, gear profile machining by relatively moving the hob cutter with respect to the workpiece in the axial direction; and performing, subsequent to the gear profile machining, second chamfering on a second axial end of the gear profile by relatively moving the hob cutter with respect to the workpiece in the radial and axial directions.

5 Claims, 6 Drawing Sheets

(51) Int. Cl.
  *B23F 17/00* (2006.01)
  *B23F 23/00* (2006.01)
  *B23F 23/12* (2006.01)
(52) U.S. Cl.
  CPC ........ *B23F 23/1218* (2013.01); *B23F 17/006* (2013.01); *Y10T 409/100159* (2015.01); *Y10T 409/101113* (2015.01); *Y10T 409/101749* (2015.01); *Y10T 409/102703* (2015.01)
(58) Field of Classification Search
  CPC .... B23F 17/00; B23F 5/22; B23F 5/24; Y10T 409/101113; Y10T 409/101272; Y10T 409/110159–103657
  USPC .............................................. 409/8–9, 11–24
  See application file for complete search history.

(56) References Cited

FOREIGN PATENT DOCUMENTS

| JP | 55-031571 A | * | 3/1980 |
| JP | 59-182020 A | * | 10/1984 |
| JP | 60-071117 A | * | 4/1985 |
| JP | 2013-212551 A | | 10/2013 |
| RU | 2343048 C1 | * | 1/2009 |

OTHER PUBLICATIONS

Machine Translation of JP 60-071117, which JP '117 was published Apr. 1985.*
Machine Translation of JP 55-031571, which JP '571 was published Mar. 1980.*
Machine Translation of JP 59-182020, which JP '020 was published Oct. 1984.*
Machine Translation RU 2343048, which RU '048 was published Jan. 2009.*

* cited by examiner

GEAR MACHINING APPARATUS AND MACHINING CONDITION DETERMINATION DEVICE

CROSS-REFERENCE TO RELATED APPLICATIONS

This application claims the benefit of priority of Japanese Patent Application No. 2020-120165 filed on Jul. 13, 2020, the entire contents of which are incorporated herein by reference.

FIELD

The present disclosure relates to a gear machining apparatus and a machining condition determination device.

BACKGROUND

JP-A-2013-212551 describes that after gear profile machining by a hob cutter, chamfering on a corner at an axial end of a gear profile is performed by a chamfer cutter.

SUMMARY

Chamfering by a chamfer cutter may be performed by a dedicated machine other than a machining apparatus including a hob cutter. In this case, it is necessary to install a dedicated machine for chamfering, which increases an equipment cost. Further, a workpiece having a gear profile processed by the hob cutter has to be transferred from the machining apparatus including the hob cutter to a machining apparatus including the chamfer cutter, which elongates the entire machining time.

It is also possible to use a general-purpose machine such as a machining center to perform gear profile machining by a hob cutter and chamfering by a chamfer cutter. In this case, in the machining apparatus, gear profile machining is performed by the hob cutter, then tool replacement is performed from the hob cutter to the chamfer cutter, and subsequently, chamfering is performed by the chamfer cutter. Therefore, the entire machining time is longer due to the tool replacement.

An object of the present disclosure is to provide a gear machining apparatus capable of shortening an entire machining time in a case of performing gear profile machining and chamfering. Another object of the present disclosure is to provide a machining condition determination device for determining a machining condition in a gear machining method executed by a gear machining apparatus.

1. Gear Machining Apparatus

A gear machining apparatus includes: a hob cutter configured to machine a gear profile on a workpiece; and at least one processor; and at least one memory having instructions that, when executed by the at least one processor, cause the gear machining apparatus to perform operations to relatively move the hob cutter and the workpiece while synchronously rotating the hob cutter and the workpiece. The operations include: performing first chamfering on a first axial end of the gear profile by relatively moving the hob cutter with respect to the workpiece in a radial direction of the workpiece while relatively moving the hob cutter with respect to the workpiece in an axial direction of the workpiece; performing, subsequent to the first chamfering, gear profile machining by relatively moving the hob cutter with respect to the workpiece in the axial direction of the workpiece; and performing, subsequent to the gear profile machining, second chamfering on a second axial end of the gear profile opposite to the first axial end in the axial direction by relatively moving the hob cutter with respect to the workpiece in the radial direction of the workpiece while relatively moving the hob cutter with respect to the workpiece in the axial direction of the workpiece.

According to the gear machining apparatus, the chamfering and the gear profile machining are performed by using the same hob cutter. More specifically, by one operation of the hob cutter in the axial direction of the workpiece, chamfering on the one axial end, machining on the gear profile, and chamfering on the other axial end can be performed sequentially.

More specifically, the chamfering on the one axial end is performed by adding an operation in the radial direction when moving the hob cutter in the axial direction of the workpiece. Subsequent to the chamfering, the hob cutter is moved in the axial direction of the workpiece to machine the gear profile. That is, the chamfering on the one axial end is performed before machining the gear profile. Subsequent to the gear profile machining, chamfering on the other axial end is performed. The chamfering on the other axial end is performed by moving the hob cutter in the radial direction of the workpiece while moving the hob cutter in the axial direction of the workpiece.

That is, the chamfering on the one axial end, the machining on the gear profile, and the chamfering on the other axial end are performed by a series of operations of the hob cutter. Therefore, in order to perform the chamfering, it is not necessary to convey the workpiece, or to perform tool replacement. Therefore, it is possible to shorten the entire machining time of the machining on the gear profile and the chamfering.

2. Machining Condition Determination Device

A machining condition determination device is configured to determine a machining condition in a gear machining method for machining a gear profile on a workpiece using a hob cutter. The gear machining method includes: performing first chamfering on a first axial end of the gear profile by relatively moving the hob cutter with respect to the workpiece in a radial direction of the workpiece while relatively moving the hob cutter with respect to the workpiece in an axial direction of the workpiece; performing, subsequent to the first chamfering, gear profile machining by relatively moving the hob cutter with respect to the workpiece in the axial direction of the workpiece; and performing, subsequent to the gear profile machining, second chamfering on a second axial end of the gear profile opposite to the first axial end in the axial direction by relatively moving the hob cutter with respect to the workpiece in the radial direction of the workpiece while relatively moving the hob cutter with respect to the workpiece in the axial direction of the workpiece.

The machining condition determination device includes at least one processor; and at least one memory having instructions that, when executed by the at least one processor, cause machining condition determination device to perform operations, the operations including: performing, in relation to each of the first chamfering and the second chamfering, simulation of a chamfered shape with respect to a plurality of types of machining conditions related to a relative movement trajectory of the hob cutter with respect to the workpiece; and determining one machining condition related to the relative movement trajectory of the hob cutter with respect to the workpiece such that the chamfered shape satisfies an allowable condition.

When the chamfering is to be performed, the relative movement trajectory of the hob cutter with respect to the workpiece cannot be easily derived. In particular, the gear profile machining may be performed in a state in which teeth of the gear and blades of the hob cutter have a helix angle, or the gear and the hob cutter have an intersection angle. For these reasons, it is not easy to grasp the relationship between the relative movement trajectory of the hob cutter and the chamfered shape.

Further, as elements of the chamfered shape, there may be various target shapes such as: a chamfer angle at a corner between an axial end edge and a tooth thickness direction end edge at a tooth top of the gear profile; an axial chamfer length at the corner between the axial end edge and the tooth thickness direction end edge at the tooth top of the gear profile; a chamfer angle at a corner between a root and an axial end face of the gear profile in an axial cross section of the workpiece; and an axial chamfer length at the corner between the root and the axial end face of the gear profile in the axial cross section of the workpiece.

Therefore, for example, the relative movement trajectory of the hob cutter cannot be simply derived based on the chamfer angle and an outer diameter of the hob cutter. Therefore, by performing the simulation, one machining condition related to the relative movement trajectory of the hob cutter with respect to the workpiece is determined such that the chamfered shape satisfies a predetermined allowable condition. As a result, it is possible to determine a machining condition such that the chamfered shape satisfies the predetermined allowable condition.

DETAILED DESCRIPTION

1. Configuration of Gear Machining Apparatus 1

The gear machining apparatus 1 will be described with reference to FIG. 1. The gear machining apparatus 1 is an apparatus that relatively moves a hob cutter T and a workpiece W to create and machine a gear profile on the workpiece W by the hob cutter T.

In this example, a general-purpose machining tool, for example, a machining center is employed as the gear machining apparatus 1. That is, the machining center is capable of tool replacement, and is capable of machining in accordance with the mounted tool. For example, the replaceable tool is, other than the hob cutter T, a gear skiving cutter, an end mill, a milling cutter, a drill, a turning tool, a screw cutting tool, a grinding tool, or the like. In FIG. 1, a tool changer and a tool magazine for storing the tools are not shown.

In this example, the machining center as the gear machining apparatus 1 is basically configured as a horizontal machining center. However, the gear machining apparatus 1 is applicable to other configurations such as a vertical machining center.

Figure 1:
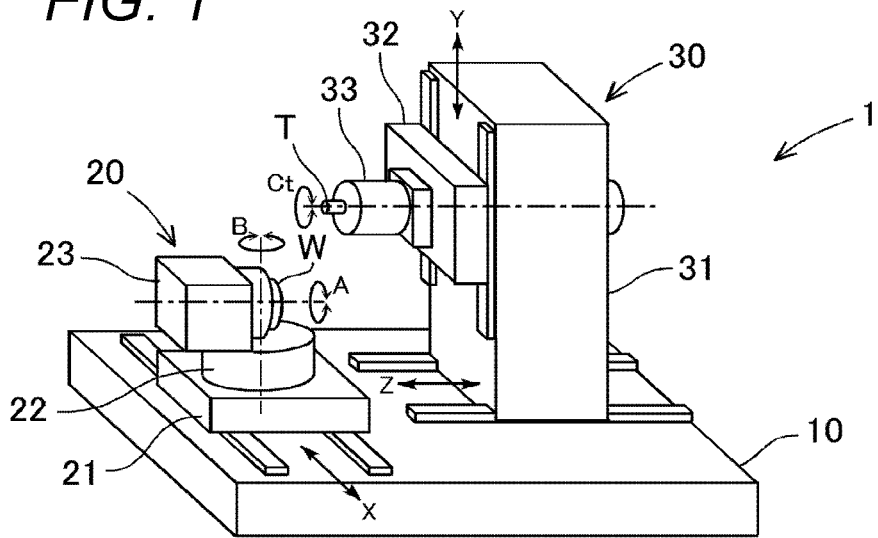
FIG. 1 is a perspective view showing an example of a gear machining apparatus.

As illustrated in FIG. 1, the gear machining apparatus 1 includes, for example, three straight axes (X axis, Y axis, Z axis) orthogonal to each other as drive axes. Here, a direction of a rotation axis of the hob cutter T (equal to a rotation axis of a tool spindle) is defined as the Z-axis direction, and two axes orthogonal to the Z-axis direction are defined as the X-axis direction and the Y-axis direction. In FIG. 1, a horizontal direction is referred to as the X-axis direction, and a vertical direction is referred to as the Y-axis direction. Further, the gear machining apparatus 1 has two rotation axes (an A axis and a B axis) for changing a relative posture between the hob cutter T and the workpiece W as drive axes. The gear machining apparatus 1 also has a Ct axis as a rotation axis for rotating the hob cutter T.

That is, the gear machining apparatus 1 is a five-axis machining tool (a six-axis machining tool considering the tool spindle (Ct axis)) capable of machining a free curved surface. Here, instead of the configuration having the A axis (a rotation axis around the X axis in a reference state) and the B axis (a rotation axis around the Y axis in the reference state), the gear machining apparatus 1 may have a Cw axis (a rotation axis around the Z axis in the reference state) and the B axis, or may have the A axis and the Cw axis.

In the gear machining apparatus 1, the configuration for relatively moving the hob cutter T and the workpiece W can be selected as appropriate. In this example, the gear machining apparatus 1 is capable of linearly moving the hob cutter T in the Y-axis direction and the Z-axis direction, linearly moving the workpiece W in the X-axis direction, and rotating the workpiece W in the A-axis direction and the B-axis direction. The hob cutter T is capable of rotating about the Ct axis.

The gear machining apparatus 1 includes a bed 10, a workpiece holder 20, and a tool holder 30. The bed 10 is formed in any shape such as a substantially rectangular shape, and is installed on a floor surface. The workpiece holder 20 is capable of linearly moving the workpiece W in the X axis direction and rotating the workpiece W about the A axis and the B axis with respect to the bed 10. The workpiece holder 20 mainly includes an X-axis movement table 21, a B-axis rotation table 22, and a workpiece spindle apparatus 23.

The X-axis movement table 21 is capable of moving in the X-axis direction with respect to the bed 10. Specifically, the bed 10 is provided with a pair of X-axis guide rails extending in the X-axis direction (front-rear direction in FIG. 1), and the X-axis movement table 21 is driven by a drive apparatus such as a linear motor or a ball screw mechanism (not shown) to move in the X-axis direction while being guided by the pair of X-axis guide rails.

The B-axis rotation table 22 is provided on an upper surface of the X-axis movement table 21 and moves integrally with the X-axis movement table 21 in the X-axis direction. The B-axis rotation table 22 is capable of rotating about the B axis with respect to the X-axis movement table 21. A rotary motor (not shown) is housed in the B-axis rotation table 22, and the B-axis rotation table 22 is driven by the rotary motor so as to rotate about the B-axis.

The workpiece spindle apparatus 23 is installed on the B-axis rotation table 22 and rotates integrally with the B-axis rotation table 22 about the B axis. The workpiece spindle apparatus 23 supports the workpiece W in a manner rotatable about the A axis. In this example, the workpiece spindle apparatus 23 supports the workpiece W in a cantilever manner. The workpiece spindle apparatus 23 includes a rotary motor (not shown) for rotating the workpiece W. According to the above configuration, the workpiece holder 20 is capable of moving the workpiece W in the X axis direction and rotating the workpiece W about the A axis and the B axis with respect to the bed 10.

The tool holder 30 mainly includes a column 31, a saddle 32, and a tool spindle apparatus 33. The column 31 is capable of moving in the Z-axis direction with respect to the bed 10. Specifically, the bed 10 is provided with a pair of Z-axis guide rails extending in the Z-axis direction (left-right direction in FIG. 1), and the column 31 is driven by a drive apparatus such as a linear motor or a ball screw mechanism (not shown) to move in the Z-axis direction while being guided by the pair of Z-axis guide rails.

The saddle 32 is disposed on a side surface of the column 31 on the workpiece W side (left side surface in FIG. 1) and parallel to a plane orthogonal to the Z-axis direction. This side surface of the column 31 is provided with a pair of Y-axis guide rails extending in the Y-axis direction (upper-lower direction in FIG. 1), and the saddle 32 is driven by a drive apparatus such as a linear motor or a ball screw mechanism (not shown) to move in the Y-axis direction.

The tool spindle apparatus 33 is installed on the saddle 32 and moves integrally with the saddle 32 in the Y-axis direction. The tool spindle apparatus 33 supports the hob cutter T so as to rotate about the Ct axis. In this example, the tool spindle apparatus 33 supports the hob cutter T in a cantilever manner. However, the tool spindle apparatus 33 may also support both ends of the hob cutter T. The tool spindle apparatus 33 includes a rotary motor (not shown) for rotating the hob cutter T. In this way, the tool holder 30 holds the hob cutter T in a manner capable of moving in the Y-axis direction and the Z-axis direction and rotating about the Ct axis with respect to the bed 10.

2. Description of Machining State by Hob Cutter T

Figure 2:
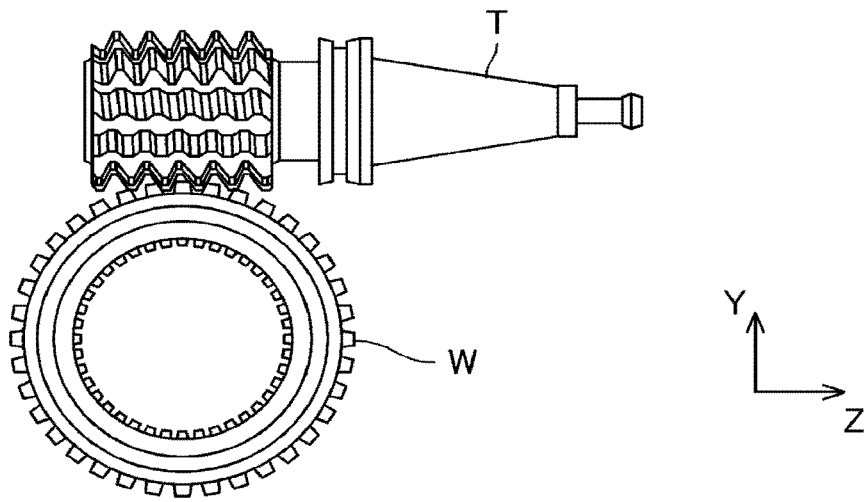
FIG. 2 is a diagram showing a state in which a workpiece is machined by a hob cutter.
Figure 3:
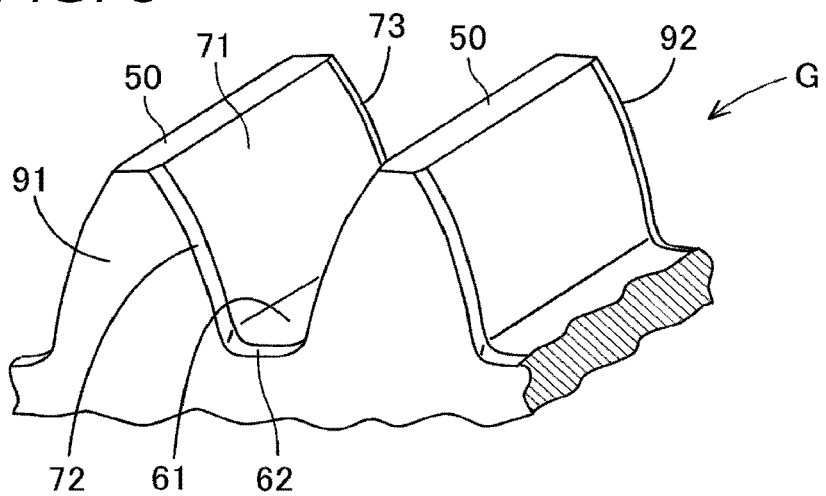
FIG. 3 is a partial perspective view of a gear.
Figure 4:
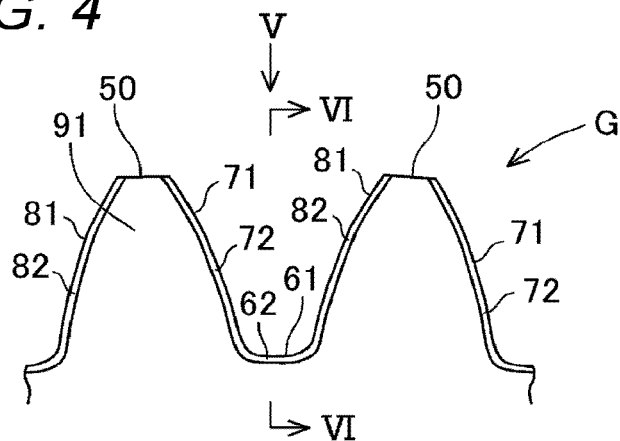
FIG. 4 is a partial view of the gear viewed from an axial direction of the gear.

A state when the gear profile is created and machined on the workpiece W by the hob cutter T will be described with reference to FIG. 2. For example, as shown in FIG. 2, the hob cutter T has an attachment portion of a base end side (right side in FIG. 2) attached to the tool spindle apparatus 33, so as to be supported in a cantilever manner. The hob cutter T includes a plurality of blades on an outer peripheral surface on a distal end side (free end side). The plurality of blades are arranged intermittently in a spiral shape. The plurality of blades of the hob cutter T are arranged in a plurality of circles. That is, the hob cutter T has a plurality of blade rows in the axial direction. FIG. 2 illustrates a case where the number of blade rows of the hob cutter T is 5 to 6.

In the gear profile machining, the central axis of the hob cutter T and the central axis of the workpiece W have an intersection angle. The intersection angle is an angle formed by an axis parallel to the central axis of the workpiece W passing through a machining point and an axis parallel to the central axis of the hob cutter T passing through the machining point. In the present example, the intersection angle is, for example, 90°, but may also be an angle other than 90°. The hob cutter T is relatively moved in the central axis direction of the workpiece W while rotating the hob cutter T about the central axis thereof and synchronously rotating the workpiece W about the central axis thereof.

In this example, the hob cutter T takes an upper end of the workpiece W as a machining position. That is, the above operation is realized by relatively moving the hob cutter T and the workpiece W in the X-axis direction and the Z-axis direction in a state in which the hob cutter T is positioned in the Y-axis direction. However, the machining position is not limited to the upper end of the workpiece W, and may also be another position in the circumferential direction of the workpiece W.

3. Design Shape of Gear G

A design shape of the gear G, which is a machining target shape of the workpiece W, that is, an ideal shape of the gear G after machining will be described with reference to FIGS. 3 to 6. Here, the gear G will be described taking an external gear as an example, but an internal gear may also be applied. In addition, in the present example, for convenience of description, a gear having no helix angle will be described, but a gear having a helix angle can also be applied.

The gear G is provided with a gear profile uneven in the circumferential direction, that is, a plurality of convex teeth. The gear G has tooth tops 50 that are top end faces of the convex teeth. A tooth space is provided between adjacent convex teeth in the circumferential direction. The tooth space is defined by a root 61, a tooth surface 71 serving as one engagement surface, and a tooth surface 81 serving as the other engagement surface. The tooth surfaces 71, 81 are formed by, for example, involute curves. The gear G includes an end face 91 on one axial side and an end face 92 on the other axial side.

Further, in the gear G, chamfers (62, 72, 82) are formed at the one axial end of the gear profile. Specifically, the gear G includes a chamfer 62 formed at a corner between the root 61 and the end face 91 on the one axial side, a chamfer 72 formed at a corner between one tooth surface 71 and the end face 91, and a chamfer 82 formed at a corner between the other tooth surface 81 and the end face 91.

Further, in the gear G, chamfers (63, 73, 83) are formed at the other axial end of the gear profile. Specifically, the gear G includes a chamfer 63 formed at a corner between the root 61 and the end face 92 on the other axial side, a chamfer 73 formed at a corner between one tooth surface 71 and the end face 92, and a chamfer 83 formed at a corner between the other tooth surface 81 and the end face 92.

Figure 5:
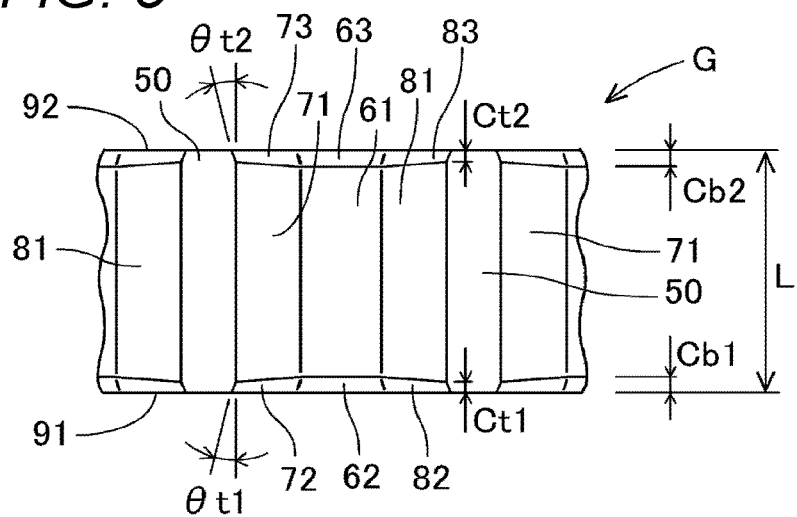
FIG. 5 is a diagram seen from a V direction in FIG. 4, that is, a diagram seen from a radially outer side of the gear.
Figure 6:
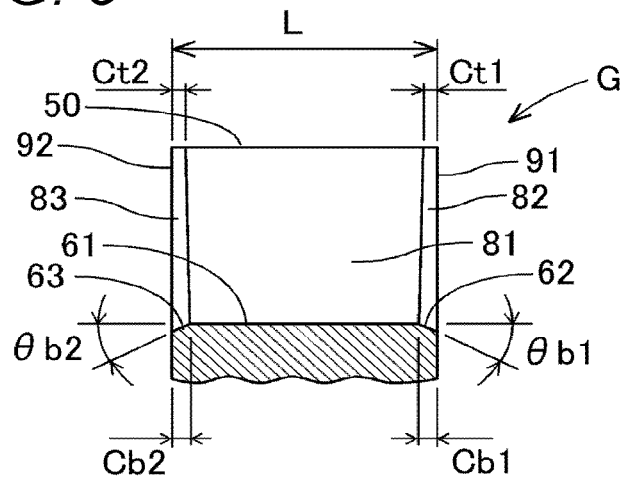
FIG. 6 is a cross-sectional view taken along the line VI-VI in FIG. 4, that is, an axial cross-sectional view of the gear.

As shown in FIGS. 5 and 6, on the one axial side, elements of the chamfered shape include a tooth top chamfer angle θt1, a tooth top chamfer length Ct1, a root chamfer angle θb1, and a root chamfer length Cb1. Further, on the other axial side, elements of the chamfered shape include a tooth top chamfer angle θt2, a tooth top chamfer length Ct2, a root chamfer angle θb2, and a root chamfer length Cb2.

The tooth top chamfer angle θt1 is a chamfer angle at a corner between an end edge on the one axial side and a tooth thickness direction end edge (an edge line extending in a tooth trace direction) at the tooth top 50 of the gear profile. The tooth top chamfer length Ct1 is an axial chamfer length at the corner between the end edge at the one axial side and the tooth thickness direction end edge at the tooth top 50 of the gear profile. The root chamfer angle θb1 is a chamfer angle at a corner between the root 61 and the end face 91 on the one axial side in an axial cross section of the gear G (workpiece W). The root chamfer length Cb1 is an axial chamfer length at the corner between the root 61 and the end face 91 on the one axial side in the axial cross section of the gear G (workpiece W). Here, the tooth top chamfer length Ct1 and the root chamfer length Cb1 are very small compared to a tooth width L.

The tooth top chamfer angle θt2 is a chamfer angle at a corner between an end edge on the other axial side and the tooth thickness direction end edge at the tooth top 50 of the gear profile. The tooth top chamfer length Ct2 is an axial chamfer length at the corner between the end edge at the other axial side and the tooth thickness direction end edge at the tooth top 50 of the gear profile. The root chamfer angle θb2 is a chamfer angle at a corner between the root 61 and the end face 92 on the other axial side in the axial cross section of the gear G (workpiece W). The root chamfer length Cb2 is an axial chamfer length at the corner between the root 61 and the end face 92 on the other axial side in the axial cross section of the gear G (workpiece W). Here, the tooth top chamfer length Ct2 and the root chamfer length Cb2 are very small compared to a tooth width L.

Further, a predetermined allowable condition is set for each element of the chamfered shape. That is, when each element of the chamfered shape in the machined workpiece W satisfies the respective predetermined allowable conditions, the workpiece W is regarded as a non-defective product. That is, the machining condition is determined to satisfy the predetermined allowable condition of each element of the chamfered shape.

4. Configuration of Control Device 100 of Gear Machining Apparatus 1

A configuration of the control device 100 of the gear machining apparatus 1 will be described with reference to FIG. 7. The control device 100 constitutes a part of the gear machining apparatus 1 shown in FIG. 1, and controls a drive apparatus 110 (such as a motor) in the gear machining apparatus 1 shown in FIG. 1. That is, the control device 100 relatively move the hob cutter T and the workpiece W while synchronously rotating the hob cutter T and the workpiece W, so as to process the gear profile on the workpiece W.

The control device 100 is configured with a computerized numerical control (CNC) apparatus, a programmable logic controller (PLC), and the like. Therefore, the control device 100 includes an arithmetic processing device such as a CPU, a storage device such as a memory, an interface for communicating with an external device, and the like.

Figure 7:
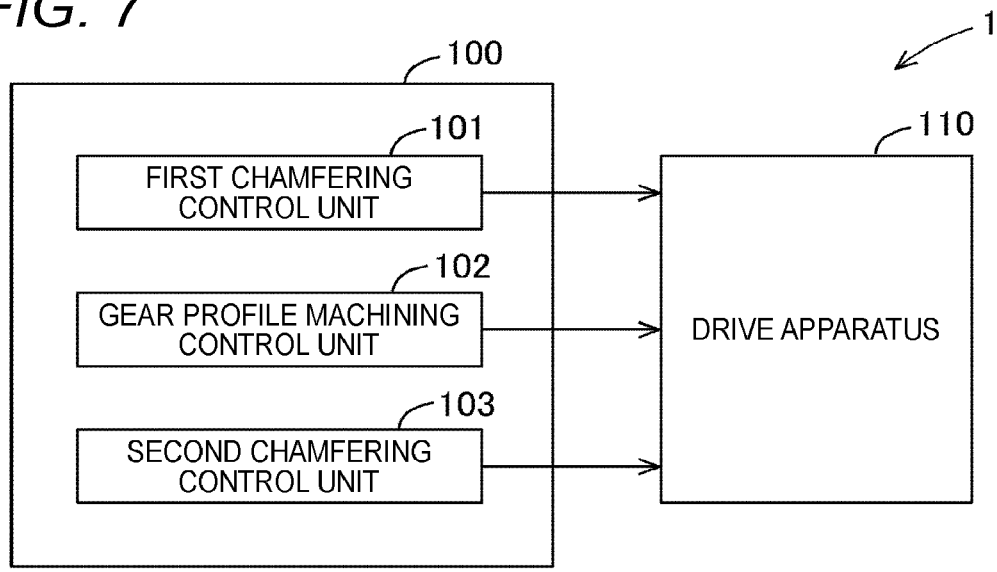
FIG. 7 is a functional block diagram showing a control device and a drive apparatus of the gear machining apparatus.
Figure 8:
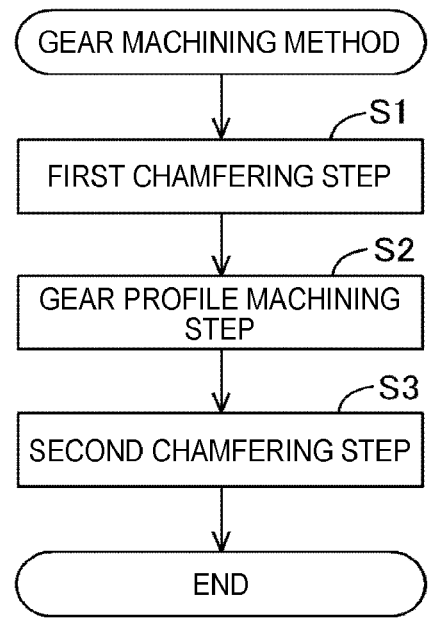
FIG. 8 is a flowchart showing a gear machining method.

As illustrated in FIG. 7, the control device 100 includes, as functional configurations, a first chamfering control unit 101, a gear profile machining control unit 102, and a second chamfering control unit 103. The first chamfering control unit 101 controls the drive apparatus 110 to process the chamfers (62, 72, 82) at the one axial end of the gear profile. The first chamfering control unit 101 controls the drive apparatus 110 by executing a control program for executing a first chamfering step described later.

The gear profile machining control unit 102 controls the drive apparatus 110 to machine the gear profile (61, 71, 81). The gear profile machining control unit 102 controls the drive apparatus 110 by executing a control program for executing a gear profile machining step described later. The second chamfering control unit 103 controls the drive apparatus 110 to process the chamfers (63, 73, 83) on the other axial end of the gear profile. The second chamfering control unit 103 controls the drive apparatus 110 by executing a control program for executing a second chamfering step described later.

5. Gear Machining Method

The gear machining method will be described with reference to FIGS. 8 to 12. The gear machining method is executed by the control units 101, 102, and 103 of the control device 100. The gear machining method includes, in order, a first chamfering step (step S1) executed by the first chamfering control unit 101, a gear profile machining step (step S2) executed by the gear profile machining control unit 102, and a second chamfering step (step S3) executed by the second chamfering control unit 103.

Hereinafter, a case where the workpiece W only rotates about the central axis while the hob cutter T simultaneously rotates and moves will be described as an example. However, since the workpiece W and the hob cutter T only need to move relative to each other, it is acceptable that the hob cutter T only rotates and the workpiece W simultaneously rotates and moves, or that the workpiece W and the hob cutter T move together.

Figure 9:
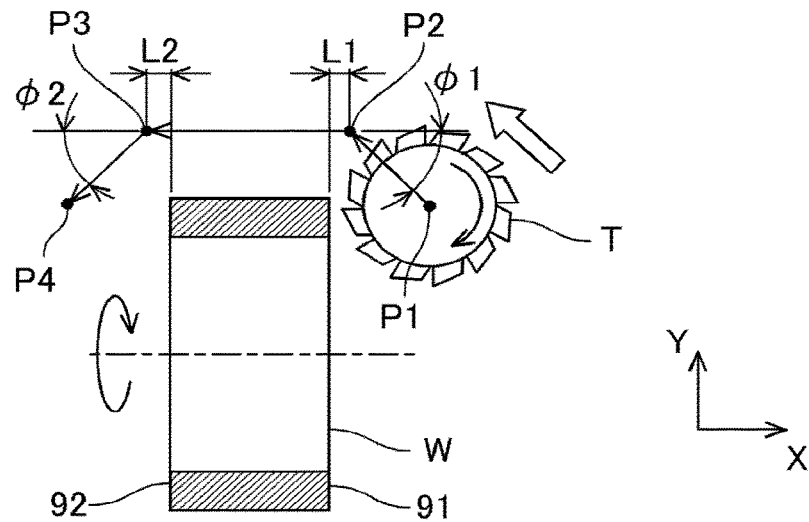
FIG. 9 is a diagram showing the gear machining method, and is a diagram showing a positional relationship between the workpiece and the hob cutter in a state in which a first chamfering step is started.

In the first chamfering step S1, as shown in FIG. 9, a reference position on the central axis of the hob cutter T is positioned at a position P1. Therefore, in the first chamfering step S1, the position P1 is a start position. Here, when the intersection angle is 90°, the central axis of the hob cutter T is located at the position P1. However, when the intersection angle is not 90°, not the entire central axis line of the hob cutter T is located at the position P1. Then, a reference position on the center line of the hob cutter T is defined, and a state in which the reference position is located at the position P1 is set as a start state of the first chamfering step S1.

Figure 10:
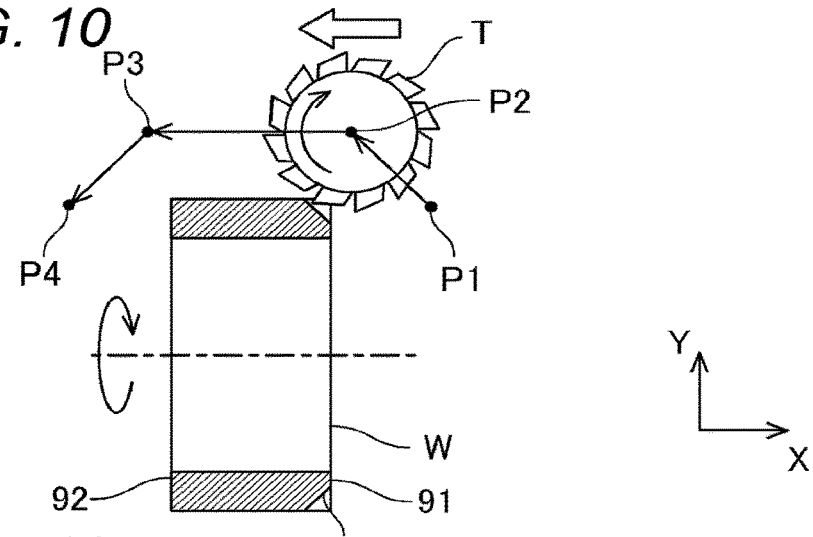
FIG. 10 is a diagram showing the gear machining method, and is a diagram showing a positional relationship between the workpiece and the hob cutter in a state in which the first chamfering step is ended and a gear profile machining is started.

Then, as shown in FIG. 10, the reference position on the central axis of the hob cutter T is linearly moved toward a position P2 with respect to the workpiece W. Therefore, in the first chamfering step S1, the position P2 is an end position. That is, the hob cutter T moves in the axial direction of the workpiece W while synchronously rotating with respect to the workpiece W, and moves in the radial direction of the workpiece W (radially outward in this example). Due to this operation, the chamfers (62, 72, 82) are machined as shown in FIG. 10.

Here, a linear movement trajectory connecting the position P1 and the position P2 and a line parallel to the central axis of the workpiece W form an acute angle φ1 (first angle). That is, a relative movement direction of the hob cutter T with respect to the workpiece W has a predetermined first angle φ1 with respect to the central axis of the workpiece W. In addition, the position P2 is separated by L1 (first separation distance) in the axial direction of the workpiece W from the end face 91 on the one axial side of the workpiece W. The first angle φ1 and the first separation distance L1 are determined by a machining condition determination device 120 to be described later. Here, the first angle φ1 is different from the tooth top chamfer angle θt1 and the root chamfer angle θb1 on the one axial side.

In the present example, the gear G is exemplified by an external gear. Therefore, in the first chamfering step S1, the hob cutter T is moved outward in the radial direction of the workpiece W while being moved in the axial direction of the workpiece W. If the gear G is an internal gear, in the first chamfering step S1, the hob cutter T is moved inward in the radial direction of the workpiece W while being moved in the axial direction of the workpiece W.

Figure 11:
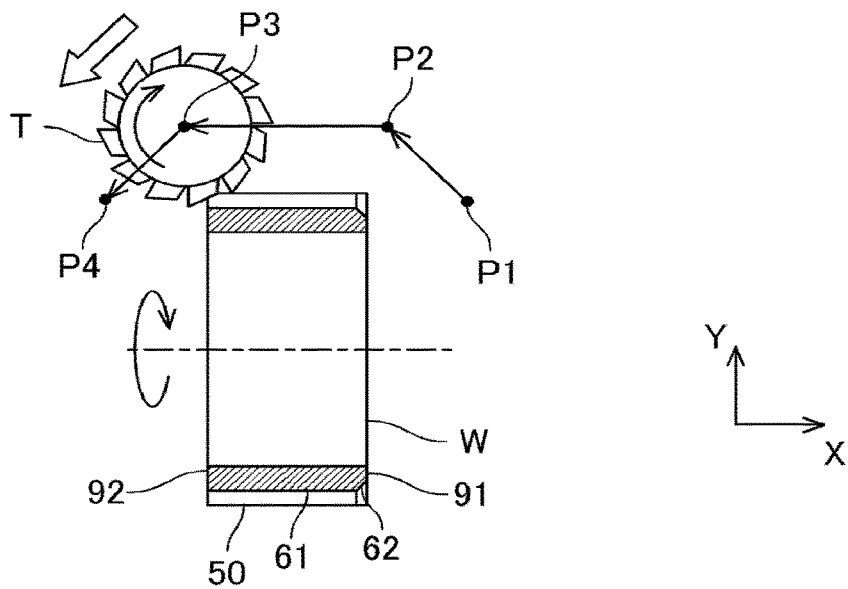
FIG. 11 is a diagram showing the gear machining method, and is a diagram showing a positional relationship between the workpiece and the hob cutter in a state in which the gear profile machining is ended and a second chamfering step is started.

The gear profile machining step S2 is performed continuously with the first chamfering step S1. Therefore, in the gear profile machining step S2, as shown in FIG. 10, the position P2 is the start position. Then, as shown in FIG. 11, the reference position on the central axis of the hob cutter T is linearly moved toward a position P3 with respect to the workpiece W. Therefore, in the gear profile machining step S2, the position P3 is an end position. That is, the hob cutter T moves in the axial direction of the workpiece W while synchronously rotating with respect to the workpiece W. Due to this operation, the gear profile (61, 71, 81) is machined as shown in FIG. 11. The operation of the gear profile machining step S2 is a known gear profile machining method performed by the hob cutter T.

Here, the position P3 is separated by L2 (second separation distance) in the axial direction of the workpiece W from the end face 92 on the other axial side of the workpiece W. The second separation distance L2 is determined by the machining condition determination device 120 to be described later.

Figure 12:
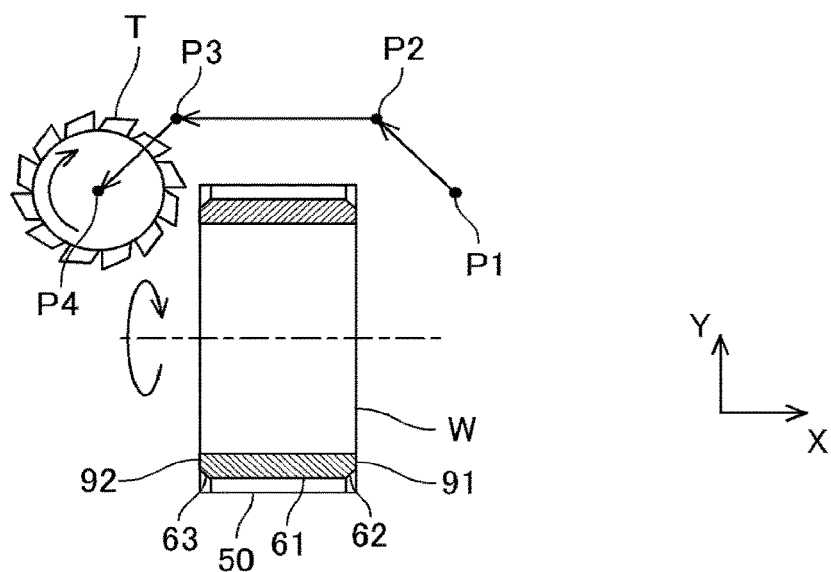
FIG. 12 is a diagram showing a gear machining method, and is a diagram showing a positional relationship between the workpiece and the hob cutter in a state in which the second chamfering step is ended.

The second chamfering step S3 is performed continuously with the gear profile machining step S2. Therefore, in the second chamfering step S3, the position P3 is a start position. Then, as shown in FIG. 12, the reference position on the central axis of the hob cutter T is linearly moved toward a position P4 with respect to the workpiece W. Therefore, in the second chamfering step S3, the position P4 is an end position. That is, the hob cutter T moves in the axial direction of the workpiece W while synchronously rotating with respect to the workpiece W, and moves in the radial direction of the workpiece W (radially inward in this example). Due to this operation, the chamfers (63, 73, 83) are machined as shown in FIG. 12.

Here, a linear movement trajectory connecting the position P3 and the position P4 and a line parallel to the central axis of the workpiece W form an acute angle φ2 (second angle). That is, a relative movement direction of the hob cutter T with respect to the workpiece W has a predetermined second angle φ2 with respect to the central axis of the workpiece W. The second angle φ2 is determined by the machining condition determination device 120 to be described later. Here, the second angle φ2 is different from the tooth top chamfer angle θt2 and the root chamfer angle θb2 on the other axial side.

In the present example, the gear G is exemplified by an external gear. Therefore, in the second chamfering step S3, the hob cutter T is moved inward in the radial direction of the workpiece W while being moved in the axial direction of the workpiece W. If the gear G is an internal gear, in the second chamfering step S3, the hob cutter T is moved outward in the radial direction of the workpiece W while being moved in the axial direction of the workpiece W.

6. Effects of Gear Machining Method Performed by Gear Machining Apparatus 1

The gear machining apparatus 1 performs the chamfering and the gear profile machining by using the same hob cutter T. More specifically, by one operation of the hob cutter T in the axial direction of the workpiece W, the chamfering on the one axial end, the machining on the gear profile, and the chamfering on the other axial end can be performed sequentially.

More specifically, the machining on the chamfers (62, 72, 82) on the one axial end is performed by the first chamfering control unit 101 by adding an operation in the radial direction when moving the hob cutter T in the axial direction of the workpiece W. Subsequent to the machining on the chamfers (62, 72, 82), the hob cutter T is moved in the axial direction of the workpiece W by the gear profile machining control unit 102 to machine the gear profile (61, 71, 81). That is, the machining on the chamfers (62, 72, 82) on the one axial end is performed before machining the gear profile (61, 71, 81). Subsequent to the machining on the gear profile (61, 71, 81), the machining on the chamfers (63, 73, 83) on the other axial end is performed by the second chamfering control unit 103. The machining on the chamfers (63, 73, 83) on the other axial end is performed by moving the hob cutter T in the radial direction of the workpiece W while moving the hob cutter T in the axial direction of the workpiece W.

That is, the machining on the chamfers (62, 72, 82) on the one axial end, the machining on the gear profile (61, 71, 81), and the machining on the chamfers (63, 73, 83) on the other axial end are performed by a series of operations of the hob cutter T. Therefore, in order to perform the chamfering, it is not necessary to convey the workpiece W, or to perform tool replacement. Therefore, it is possible to shorten the entire machining time of the machining on the gear profile (61, 71, 81) and the machining on the chamfers (62, 72, 82, 63, 73, 83).

7. Configuration of Machining Condition Determination Device 120

In order to realize the gear machining method, it is necessary to determine machining conditions for machining the chamfers (62, 72, 82) at the one axial end and the chamfers (63, 73, 83) at the other axial side. The machining condition determination device 120 for determining the machining condition will be described with reference to FIG. 13. The machining condition determination device 120 determines the first angle φ1, the second angle φ2, the first separation distance L1, and the second separation distance L2 as elements of the machining condition by performing simulation of the chamfered shape (see FIG. 9).

First, the purpose of determining the machining condition by simulation of the chamfered shape will be described. When the chamfering as described above is to be performed, the relative movement trajectory of the hob cutter T with respect to the workpiece W cannot be easily derived. In particular, the gear profile machining may be performed in a state in which teeth of the gear G and blades of the hob cutter T have a helix angle, or the gear and the hob cutter T have an intersection angle. For these reasons, it is not easy to grasp the relationship between the relative movement trajectory of the hob cutter T and the chamfered shape.

Further, as elements of the chamfered shape, there may be various target shapes such as: the chamfer angles $\theta t1$, $\theta t2$ at the corners between the axial end edges and the tooth thickness direction end edge at the tooth top 50 of the gear profile; the axial chamfer lengths Ct1, Ct2 at the corners between the axial end edges and the tooth thickness direction end edge at the tooth top 50 of the gear profile; the chamfer angles $\theta b1$, $\theta b2$ at the corners between the root 61 and the axial end faces of the gear profile in the axial cross section of the workpiece W; and the axial chamfer lengths Cb1, Cb2 at the corners between the root and the axial end faces of the gear profile in the axial cross section of the workpiece W.

Therefore, for example, the relative movement trajectory of the hob cutter T cannot be simply derived based on the chamfer angles $\theta t1$, $\theta t2$, $\theta b1$, $\theta b2$ and the outer diameter of the hob cutter T. Therefore, by performing the simulation of the chamfered shape, one machining condition related to the relative movement trajectory of the hob cutter with respect to the workpiece W is determined such that the chamfered shape satisfies the predetermined allowable condition. As a result, it is possible to determine a machining condition such that the chamfered shape satisfies the predetermined allowable condition.

The machining condition determination device 120 may constitute a part of the gear machining apparatus 1 illustrated in FIG. 1, or may be installed as an apparatus separate from the gear machining apparatus 1. When constituting a part of the gear machining apparatus 1, the machining condition determination device 120 may be arranged integrally with the mechanical configuration of the gear machining apparatus 1, or may be installed in a place separate from the mechanical configuration of the gear machining apparatus 1 to constitute a network. When a CNC apparatus is used to constitute the control device 100 of the gear machining apparatus 1, the machining condition determination device 120 is preferably configured as an embedded system of the control device 100. In addition, the machining condition determination device 120 includes an arithmetic processing device such as a CPU, a storage device such as a memory, an interface for communicating with an external device, and the like. Further, the machining condition determination device 120 may include an input device or a display device.

Figure 13:
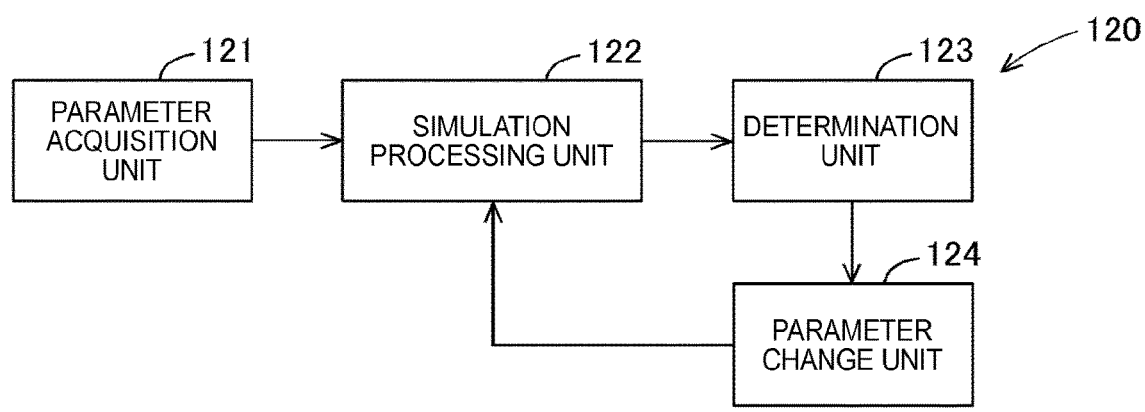
FIG. 13 is a functional block diagram of a machining condition determination device.

As illustrated in FIG. 13, the machining condition determination device 120 includes, as functional configurations, a parameter acquisition unit 121, a simulation processing unit 122, a determination unit 123, and a parameter change unit 124.

The parameter acquisition unit 121 acquires the first angle $\varphi 1$, the second angle $\varphi 2$, the first separation distance L1, and the second separation distance L2 as parameters of elements of the machining condition. For example, the parameter acquisition unit 121 may acquire only an initial value of each parameter, or may acquire a plurality of values for each parameter.

The simulation processing unit 122 performs simulation of the gear machining method described above using one parameter acquired by the parameter acquisition unit 121. Then, the simulation processing unit 122 can acquire the shape, in particular, the chamfered shape of the workpiece W after machining. Specifically, as elements of the chamfered shape, the chamfer angles $\theta t1$, $\theta t2$, $\theta b1$, $\theta b2$ and the chamfer lengths Ct1, Ct2, Cb1, Cb2 can be acquired.

The determination unit 123 determines whether or not the chamfered shape of the workpiece W after machining obtained by the simulation processing unit 122 satisfies a predetermined allowable condition. Specifically, the determination unit 123 determines whether or not each element of the chamfered shape satisfies a predetermined allowable condition.

When the predetermined allowable condition is not satisfied based on the determination result of the determination unit 123, the parameter change unit 124 changes the parameter of the simulation performed by the simulation processing unit 122. When the parameter acquisition unit 121 acquires only the initial value, the parameter change unit 124 changes the value of the parameter by appropriately changing the initial value, and causes the simulation processing unit 122 to perform the simulation using the changed value of the parameter. When the parameter acquisition unit 121 acquires a plurality of values, the parameter change unit 124 causes the simulation processing unit 122 to perform simulation using the other values of the parameter.

As described above, by the simulation processing unit 122 performing simulation of the chamfered shape for the plurality of types of machining conditions, the determination unit 123 can determine one machining condition that satisfies the predetermined allowable condition.

The machining condition determined by the machining condition determination device 120 is used for control in the control device 100. Specifically, the first chamfering control unit 101 controls the drive apparatus 110 based on the first angle $\varphi 1$ and the first separation distance L1 as elements of the determined machining condition. In addition, the gear profile machining control unit 102 controls the drive apparatus 110 based on the first separation distance L1 and the second separation distance L2 as elements of the determined machining condition. In addition, the second chamfering control unit 103 controls the drive apparatus 110 based on the second angle $\varphi 2$ and the second separation distance L2 as elements of the determined machining condition.

8. Example of Condition Determination Process

Figure 14:
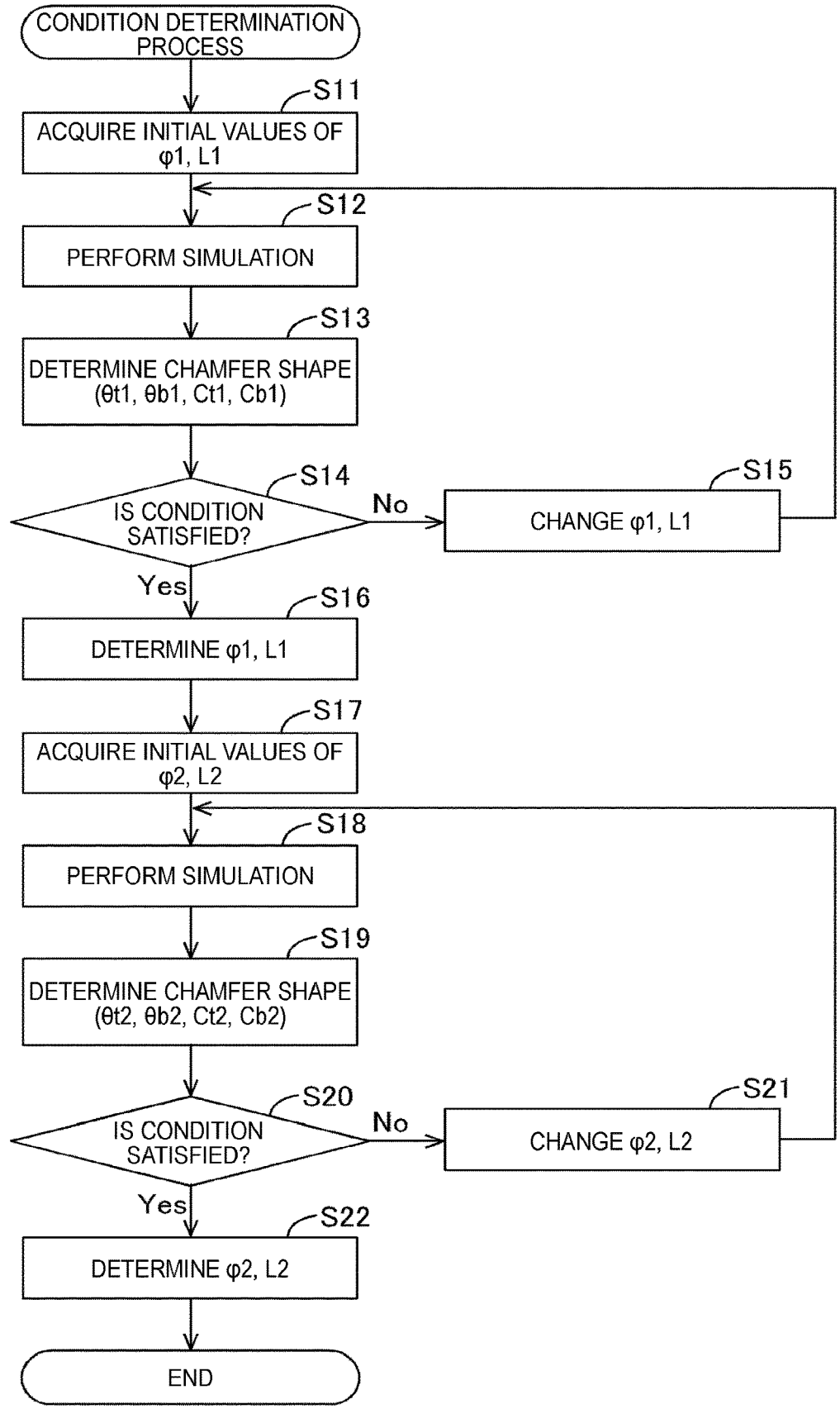
FIG. 14 is a flowchart showing condition determination performed by the machining condition determination device.

An example of the condition determination process performed by the machining condition determination device 120 will be described with reference to FIG. 14. In this example, the parameter acquisition unit 121 acquires the initial value of the parameter.

First, the parameter acquisition unit 121 acquires initial values of the first angle $\varphi 1$ and the first separation distance L1 as elements of the machining condition of the first chamfering step S1 (step S11). Subsequently, simulation is performed by the simulation processing unit 122 (step S12). Subsequently, the determination unit 123 determines the shape ($\theta t1$, $\theta b1$, Ct1, Cb1) of the chamfers (62, 72, 82) in the one axial side (step S13). Subsequently, as a result of the determination, if the predetermined allowable condition is not satisfied (step S14: No), the parameter change unit 124 changes the values of the parameters $\varphi 1$ and L1 (step S15). Then, the process returns to step S12, and the simulation is performed.

Therefore, the simulation of different values of the parameters is repeated until the shape ($\theta t1$, $\theta b1$, Ct1, Cb1) of the chamfers (62, 72, 82) on the one axial side satisfies the predetermined allowable condition. When the predetermined allowable condition is satisfied (S14: Yes), the values of $\varphi 1$ and L1 which satisfy the predetermined allowable condition are determined as elements of the machining condition (step S16).

Subsequently, the parameter acquisition unit 121 acquires initial values of the second angle $\varphi 2$ and the second separation distance L2 as elements of the machining condition of the second chamfering step S3 (step S17). Subsequently, simulation is performed by the simulation processing unit 122 (step S18). Subsequently, the determination unit 123 determines the shape (θt2, θb2, Ct2, Cb2) of the chamfers (63, 73, 83) in the other axial side (step S19). Subsequently, as a result of the determination, if the predetermined allowable condition is not satisfied (step S20: No), the parameter change unit 124 changes the values of the parameters φ2 and L2 (step S21). Then, the process returns to step S18, and the simulation is performed.

Therefore, the simulation of different values of the parameters is repeated until the shape (θt2, θb2, Ct2, Cb2) of the chamfers (63, 73, 83) on the other axial side satisfies the predetermined allowable condition. When the predetermined allowable condition is satisfied (S20: Yes), the values of φ2 and L2 which satisfy the predetermined allowable condition are determined as elements of the machining condition (step S22).

In this way, the machining condition can be determined. In the above condition determination, the determination of the first angle φ1 and the first separation distance L1 and the determination of the second angle φ2 and the second separation distance L2 are performed in separate steps. Alternatively, the simulation and the determination may be performed in one time for all the elements (φ1, φ2, L1, and L2) of the machining condition.

The invention claimed is:

1. A gear machining apparatus comprising:
   a hob cutter configured to machine a gear profile on a workpiece;
   at least one processor; and
   at least one memory having instructions that, when executed by the at least one processor, cause the gear machining apparatus to perform operations to relatively move the hob cutter and the workpiece while synchronously rotating the hob cutter and the workpiece,
   wherein the operations comprise:
      performing first chamfering on a first axial end of the gear profile by relatively moving the hob cutter with respect to the workpiece in a radial direction of the workpiece while relatively moving the hob cutter with respect to the workpiece in an axial direction of the workpiece;
      performing, subsequent to the first chamfering, gear profile machining by relatively moving the hob cutter with respect to the workpiece in the axial direction of the workpiece; and
      performing, subsequent to the gear profile machining, second chamfering on a second axial end of the gear profile opposite to the first axial end in the axial direction by relatively moving the hob cutter with respect to the workpiece in the radial direction of the workpiece while relatively moving the hob cutter with respect to the workpiece in the axial direction of the workpiece.

2. The gear machining apparatus according to claim 1,
   wherein in the first chamfering, the hob cutter is relatively moved with respect to the workpiece in a first relative movement direction forming a first angle with respect to a central axis of the workpiece,
   wherein in the second chamfering, the hob cutter is relatively moved with respect to the workpiece in a second relative movement direction forming a second angle with respect to a central axis of the workpiece,
   wherein the first angle is set to be different from a first chamfer angle at the first axial end of the gear profile, and
   wherein the second angle is set to be different from a second chamfer angle at the second axial end of the gear profile.

3. The gear machining apparatus according to claim 1,
   wherein the operations further comprise:
      performing, in relation to each of the first chamfering and the second chamfering, simulation of a chamfered shape with respect to a plurality of types of machining conditions related to a relative movement trajectory of the hob cutter with respect to the workpiece; and
      determining one machining condition related to the relative movement trajectory of the hob cutter with respect to the workpiece such that the chamfered shape satisfies an allowable condition, and
   wherein each of the first chamfering and the second chamfering is performed based on the one machining condition.

4. The gear machining apparatus according to claim 3,
   wherein the machining condition in the first chamfering comprises: a first angle indicating a direction of a first relative movement of the hob cutter with respect to the workpiece; and a first end position of the first relative movement at the first angle, and
   wherein the machining condition in the second chamfering comprises: a second angle indicating a direction of a second relative movement of the hob cutter with respect to the workpiece; and an second end position of the relative movement at the second angle.

5. The gear machining apparatus according to claim 3,
   wherein an element of the chamfered shape comprises at least one of:
      a first chamfer angle at a first corner of a tooth top of the gear profile, the first corner being defined by an end edge in the axial direction and an end edge in a tooth thickness direction;
      a first axial chamfer length at the first corner;
      a second chamfer angle at a second corner in an axial cross section of the workpiece, the second corner being defined by a tooth root and an axial end face of the gear profile; and
      a second axial chamfer length at the second corner.

* * * * *